Jan. 22, 1929.  O. HERTING  1,699,843
COOKING UTENSIL
Filed Jan. 3, 1927
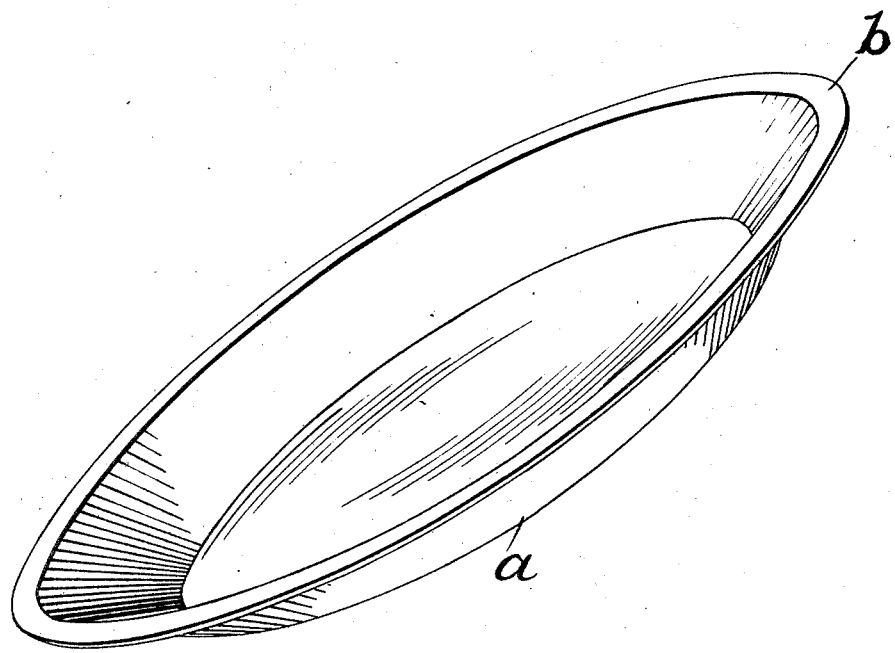
WITNESS:
P. h. R. Kitchel.
INVENTOR
Otto Herting
BY
Busser & Harding
ATTORNEYS.

Patented Jan. 22, 1929.

1,699,843

UNITED STATES PATENT OFFICE.

OTTO HERTING, OF PHILADELPHIA, PENNSYLVANIA, ASSIGNOR TO SANI PAPER PRODUCTS CO. INC., OF PHILADELPHIA, PENNSYLVANIA, A CORPORATION OF DELAWARE.

COOKING UTENSIL.

Application filed January 3, 1927. Serial No. 158,521.

My invention relates to an improved cooking utensil, and more especially to a utensil for baking.

Heretofore in baking, as in baking bread, cake and pies, it has been substantially universally customary to contain the article or ingredient to be baked in a plate or pan made from some suitable metal, though there has been suggested and there are obtainable earthenware and glass containers for the purpose.

In baking and more especially in baking pies, baking pans or plates, whether made of metal, earthenware or glass, are, I have discovered, open to a number of serious objections which prevent the production of an entirely satisfactory product.

The process of baking, for example, a pie, has for its object the cooking of the dough and filler and at the same time the production of a nicely browned and flaky crust from the dough. While heretofore it has been relatively simple for one skilled in the art to produce a pie, the filler of which is properly cooked and having an upper crust possessive of the desired characteristics, it has been found very difficult to produce a satisfactory under crust, the under crust usually produced being substantially soggy, or where sogginess is avoided it is usually found that the under crust is burnt.

In the baking operation, a substantial degree of heat is required and when the dough, from which the crust of the pie is formed, is subjected, to heat a substantial amount of grease, present in the dough in the form of butter or lard utilized as shortening, is tried out of the dough. This grease subjected to the baking heat tends to fry in the pan, of metal, earthenware or glass, and cause the under crust of the pie to be fried, rather than baked as desired.

When the baking of the pie is complete, it is customary to permit it to cool in the pan in which it was baked. In the cooling operation, the pan cools more rapidly than does the interior of the pie, with the result that condensation takes place on the inside of the pan, of metal, earthenware or glass, between the pan and under crust of the pie. As the cooling of the pie proceeds, the moisture condensed together with any grease left on the pan is absorbed by the under crust, causing it to be soggy.

After the pie has been removed from the pan, substantial effort is required to clean the pan because of crust and grease adhering thereto, and the pan, if of metal, as tin, zinc, etc., becomes discolored from the action of acids present in fruit juices, when fruits, such as apples, peaches, etc., are used for the filler of the pie.

When fruits are used for the filler of pies and such pies are baked in the usual metal pans certain reactions between the acids in the fruit juices and the metal of the pan take place which result in the formation of substances, such as fruit acid salts and sulphur compounds, which are absorbed in the under crust of the pie and to say the least affect the taste of the pie, if they are not in some instances injurious to the consumer.

Now it is the object of my invention to provide a cooking utensil which may be utilized, for example, for containing pie during the baking process, which will be resistant to baking heat, which will be absorptive, thus avoiding absorption of grease and moisture by the under crust of the pie and frying of the under crust, and from which there will be no exudation when heated.

Further objects of my invention are to produce a cooking utensil at a minimum of expense, enabling its use but once, to which a pie, for example, will have no tendency to adhere, without the necessity for greasing, and one which may be utilized not only for the baking operation, but also for delivery or storage of the product.

Having now indicated, in a general way, the nature and purpose of my invention, I will proceed to a detailed description of a preferred embodiment thereof, with reference to the accompanying drawings, in which:—

The figure is a perspective view of a pan embodying my invention for use in baking pies.

In the drawing $a$ indicates a plate or pan, preferably pressed from a blank formed from fibrous material and having a finished edge $b$. The material from which the plate or pan is formed may be, for example, a board made from wood or vegetable pulp or of any other material having the desired capacity for absorption.

In the treatment of the material such as fibre, pulp, etc. from which the plate or pan is to be produced, as has been indicated, the material is impregnated with a substance which will render it resistant to heat at cooking temperatures, which will not affect the absorptive qualities of the material, or which will be itself absorptive, which will not exude from the material when heated as in cooking, which will not cause the article, as a pie, when cooked to adhere to the plate, and preferably, though not necessarily, which will improve the heat conductive qualities of the fibre.

Various substances, or combinations of substances, may be utilized for treatment of the material in accordance with my invention, and the substances with which it is desired to have the material impregnated may be formed within the body of the material by chemical reaction as a result of successive treatments with substances which will react to produce the desired substance. For example, the material may be impregnated with titanium silicate, or it may be impregnated by treatment with or saturation with a solution containing sodium sulphate, borax and sodium silicate in water with subsequent drying. For example the material may be saturated with a solution according to the following formula:

| | |
|---|---|
| Sodium sulphate | 70 pounds |
| Borax | 45 pounds |
| Sodium silicate sol. (preferably 40° Bé.) | 120 gallons |
| Water to make 300 gallons | | and subsequently dried. The drying operation may be facilitated by blowing air into the solution to effect the change of any free caustic soda present in the sodium silicate, and which is slow drying, into sodium carbonate.

If desired the material may be treated successively with solutions containing different substances with a view to producing a desired substance within the material by chemical reaction. For example, the material may be saturated with a solution according to the following formula:

*Solution A.*

| | |
|---|---|
| Aluminum sulphate | 8 oz. |
| Titanium sulphate | ½ oz. |
| Water | 1 gallon |

After partial drying of the material, it is again saturated in a solution according to the following formula:

*Solution B.*

| | |
|---|---|
| Sodium sulphate | 10 pounds |
| Sodium tetraborate (borax) | 5 pounds |
| Silicate of soda solution | 14 gallons |
| Water | 28 gallons |

On saturation with Solution B a reaction will take place between the aluminum and titanium sulphate and the silicate of soda with the formation of aluminum and titanium silicate within the material treated. The reaction may be facilitated by heating the solution to say a temperature within the range 140° F to 180° F. After saturation with the Solution B the material is dried and the drying may be facilitated by the introduction of air into Solution B, or by the addition to Solution B of say from 3–5 pounds of sodium bicarbonate to 300 gallons of solution to facilitate the change of any free caustic soda, which may be present in the silicate of soda and which is slow drying, into sodium carbonate. When the material is impregnated with aluminum and titanium silicate its heat conductivity will be materially increased.

It will be understood that in the treatment of the material as described above the titanium may be omitted, the material being treated with or for the formation of aluminum silicate only which when formed by treatment with aluminum sulphate and sodium silicate in solution, as indicated, will result in the formation of a complex silicate, as aluminum-sodium silicate. Titanium and iron will under similar conditions form complex silicates. It will be further understood that any non-poisonous metal, as for example, iron may be substituted for the aluminum, with or without the use of titanium. Thus, it will be understood that my invention contemplates the impregnation of the material with a metallic silicate, either by direct impregnation or by the formation of the silicate in the material by successive treatments.

It will further be understood that when the silicate, as aluminum, or other metal silicate, is formed in the material by successive treatments the first treatment to effect impregnation of the material with, for example, aluminum sulphate may be effected when the material is manufactured, the aluminum sulphate being added, for example, to the material in the beaters.

The pan or other utensil, embodying my invention, is preferably formed before the material, saturated for its impregnation, is fully dried so that it will lend itself to formation in dies, or by any other desired means. After its formation the pan or other utensil may be finally dried.

The use of the plate or pan embodying my invention will, it is believed be obvious, it being observed that the pan having the capacity to resist the heat of cooking temperatures and the capacity of absorbing grease tried from the under crust during cooking, which capacity for absorption is not materially reduced by the substances with which it is impregnated, permits of the production of a pie without frying of the under crust and with the prevention of sogginess of the under crust. In the use of the pan the heat resistant substances, as the aluminum and titanium silicates, with which it is impregnated will not exude and since there is no frying of the under crust of the pie, the pie will not stick to the pan but may be readily removed therefrom even after it has completely cooled.

On the completion of the baking operation, the pan serves as a container for the storage or delivery of the pie, which may be readily removed from the pan when desired.

It will be noted that while I have described my invention more particularly with reference to a pan for baking pies, I do not intend to limit my invention thereto, since it is adaptable for the production of cooking utensils of various forms for various other uses, and while I have given certain specific formulæ for use in treatment of the material to give it the characteristic desired in the pan or utensil, it will be understood that my invention is not to be limited thereto, since it contemplates within its scope any means for the production of a utensil having the characteristics described.

While I have particularly described my invention as involving the incorporation into a fibrous material of a silicate, either of the normal or complex type, it will be apparent that many equivalent impregnating substances having the characteristics of insolubility in water, rendering the fibrous material fireproof at baking temperatures and of not exuding at such temperatures may be used. These substances must also be heat resistant in the sense that during the baking they will not decompose with evolution of deleterious substances or loss of the above noted necessary characteristics. A substance will be heat resistant in the above sense even if it should, during the heating, lose water of crystallization or a harmless gas such as carbon dioxide provided its physical characteristics remain the same. Accordingly, the term "heat resistant" is used in the claims to indicate that the physical properties, outlined above, which render the impregnating substance applicable for the purpose desired, remain unchanged during the baking, even though a change in the chemical nature of the impregnating substance takes place.

Having now fully described my invention, what I claim and desire to protect by Letters Patent is:—

1. A cooking utensil consisting of a normally inflammable absorptive material impregnated with a water insoluble, heat resistant substance, which will not exude therefrom at baking temperatures, and which will render the material substantially fireproof at such temperatures.

2. A cooking utensil consisting of a normally inflammable fibrous material impregnated with a water insoluble, heat resistant substance, which will not exude therefrom at baking temperatures, and which will render the material substantially fireproof at such temperatures.

3. A cooking utensil consisting of absorptive material containing a water insoluble aluminum salt, and which is rendered substantially fireproof at baking temperatures.

4. A cooking utensil consisting of fibre impregnated with an aluminum silicate

5. A cooking utensil consisting of fibre impregnated with aluminum and titanium silicates.

6. A cooking utensil consisting of normally inflammable absorptive material impregnated with a water insoluble complex silicate, as sodium-aluminum silicate, or the like, and which is rendered substantially fireproof at baking temperatures.

7. A cooking utensil consisting of a normally inflammable absorptive material impregnated with the substances formed by the interaction of aluminum sulphate, titanium sulphate, sodium tetraborate and sodium silicate.

In testimony of which invention, I have hereunto set my hand, at Philadelphia, Pennsylvania, on this 29th day of December, 1926.

OTTO HERTING.